US009534645B2

(12) United States Patent
Lee

(10) Patent No.: US 9,534,645 B2
(45) Date of Patent: Jan. 3, 2017

(54) TOUCH POINT CORRECTION METHOD FOR DOUBLE CLUTCH TRANSMISSION

(71) Applicants: Hyundai Motor Company, Seoul (KR); Kia Motors Corp., Seoul (KR)

(72) Inventor: Ho Young Lee, Bucheon-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 14/717,188

(22) Filed: May 20, 2015

(65) Prior Publication Data

US 2016/0138664 A1    May 19, 2016

(30) Foreign Application Priority Data

Nov. 17, 2014  (KR) .................. 10-2014-0159852

(51) Int. Cl.
| | | |
|---|---|---|
| F16D 13/38 | (2006.01) | |
| F16D 48/00 | (2006.01) | |
| F16D 21/00 | (2006.01) | |
| F16D 21/06 | (2006.01) | |

(52) U.S. Cl.
CPC ............ F16D 48/00 (2013.01); F16D 13/385 (2013.01); F16D 21/00 (2013.01); *F16D 2021/0615* (2013.01); *F16D 2500/502* (2013.01); *F16D 2500/50245* (2013.01); *F16D 2500/50251* (2013.01); *F16D 2500/50269* (2013.01)

(58) Field of Classification Search
None
See application file for complete search history.

(56) References Cited

U.S. PATENT DOCUMENTS

| | | | | |
|---|---|---|---|---|
| 5,871,419 A | * | 2/1999 | Amendt | ............... F16D 48/066 477/180 |
| 6,050,379 A | * | 4/2000 | Lyon | ...................... F16D 28/00 192/54.1 |
| 2012/0290249 A1 | * | 11/2012 | Hebbale | .................. F16D 48/06 702/130 |
| 2014/0136064 A1 | * | 5/2014 | Baek | ...................... F16D 48/06 701/68 |
| 2014/0136066 A1 | * | 5/2014 | Cho | ........................ F16D 48/06 701/68 |

FOREIGN PATENT DOCUMENTS

| | | |
|---|---|---|
| JP | 2006-1338 A | 1/2006 |
| KR | 10-2012-0046170 A | 5/2012 |
| KR | 10-2013-0131478 A | 12/2013 |
| KR | 10-1355620 B1 | 1/2014 |

* cited by examiner

*Primary Examiner* — Justin Holmes
(74) *Attorney, Agent, or Firm* — Morgan, Lewis & Bockius LLP

(57) ABSTRACT

A touch point correction method includes determining respective temperatures of a first pressure plate, a second pressure plate, and a center plate and measuring an average temperature of the determined temperatures, determining rotational inertia based on the measured average temperature, determining a touch point correction amount based on the rotational inertia and engine speed of a vehicle, and correcting a touch point of a relevant clutch using the determined touch point correction amount.

4 Claims, 3 Drawing Sheets

TOUCH POINT CORRECTION METHOD FOR DOUBLE CLUTCH TRANSMISSION

CROSS REFERENCE TO RELATED APPLICATION

The present application claims priority of Korean Patent Application Number 10-2014-0159852 filed on Nov. 17, 2014, the entire contents of which application are incorporated herein for all purposes by this reference.

BACKGROUND OF THE INVENTION

Field of the Invention

The present invention generally relates to a touch point correction method for a Double Clutch Transmission (DCT) and, more particularly, to technology that can more suitably correct a touch point that is the clutch characteristic of a DCT in consideration of changes in the temperature and centrifugal force of a relevant clutch.

Description of Related Art

An Automated Manual Transmission (AMT) including a Double Clutch Transmission (DCT) is a system for automatically controlling a manual transmission mechanism. There are many cases where an AMT is configured to transfer engine torque to a transmission mechanism using a dry clutch, unlike a typical Automatic Transmission (A/T) that uses a torque converter and a wet multi-disc clutch.

A dry clutch is controlled by an actuator, which is typically controlled using a Torque-Speed (T-S) curve indicating a variation in the transfer torque of the dry clutch depending on the stroke of the actuator.

Meanwhile, the dry clutch has characteristics wherein transfer torque thereof is greatly changed depending on a plurality of factors, such as the tolerance of each component, abrasion attributable to durability, thermal deformation attributable to high temperature, and a change in the friction coefficient of a disc. Thus, it is difficult to uniformly configure data from the transfer torque of the dry clutch.

However, upon performing a control operation, if the dry clutch does not desirably reflect changes in the characteristics of the transfer torque and then the actuator is controlled either insufficiently or excessively, excessive slipping of the dry clutch occurs, or an impact is applied to the dry clutch. Thus, technology is required for precisely predicting in real time the characteristics of the transfer torque of a dry clutch depending on the actuator stroke and utilizing the predicted transfer torque characteristics for controlling the actuator.

However, in order to predict the torque characteristics of the dry clutch, a driving condition and a restrictive condition for the prediction of characteristics are present. Therefore, it is difficult to detect the characteristics of the dry clutch in real time. In particular, there are more constraints for the touch point of the clutch.

For reference, a touch point denotes an actuator stroke at a time at which electric power starts to be transferred to the dry clutch.

FIG. 1 is a diagram showing the clutch structure of a DCT to which the present invention is applied. In the clutch structure, a first clutch 100 and a second clutch 200 are provided on opposite sides of a center plate 10. The first clutch 100 includes a first clutch plate 20 pressurized by the center plate 10 to receive electric power, and a first pressure plate 30 configured to pressurize the first clutch plate 20 with the center plate 10. The second clutch 200 includes a second clutch plate 50 and a second pressure plate 40. The first pressure plate 30 is configured to, when a first engagement bearing 70 moves to the left, pressurize the first clutch plate 20 with the center plate 10. The second pressure plate 40 is configured to, when a second engagement bearing 60 moves to the left, pressurize the second clutch plate 50 with the center plate 10.

In the past, in order to correct the touch point of any one clutch, the touch point is corrected based only on the temperature of the pressure plate of the relevant clutch, but the touch point is influenced by the temperature of the center plate 10 or the pressure plate of the other clutch. In addition, other components may have different temperature changes. As a result, there is a disadvantage in that a touch point is not sufficiently and suitably corrected by a conventional correction method.

Further, a problem may arise in that the first pressure plate 30, the second pressure plate 40, and the center plate 10 constituting the clutch may be deformed due to an increase in the temperature thereof while the vehicle is traveling, thus causing the cover plate 80 of the clutch to be bent.

It is apparent that, when the clutch is rotating in a state in which the cover plate 80 is bent, the radius of rotation of the clutch is changed due to deformation caused by the temperature increase, and then rotational inertia is also changed due to the change in the radius of rotation.

In the past, there was a touch point correction method considering a change in temperature, but a touch point correction method that considers rotational inertia based on a temperature increase, as described above, has not yet been presented. Then, the present invention is intended to provide a correction method that calculates a change in a centrifugal force based on rotational inertia and engine speed and that also considers the change in the centrifugal force upon subsequently correcting a touch point.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a touch point correction method for a Dual Clutch Transmission (DCT) by a controller, which can correct the touch points of clutches in consideration of not only the characteristics of changes in the touch points of a first clutch and a second clutch depending on changes in the temperatures of a first pressure plate, a second pressure plate, and a center plate constituting the clutch structure of the DCT, but also a change in a centrifugal force depending on temperature change, so that the clutches may be more suitably controlled, thus improving the durability of the clutches and preventing the impact of gear-shifting, with the result that the marketability of vehicles may be improved.

In order to accomplish the above object, a touch point correction method for a Dual Clutch Transmission (DCT) is disclosed.

For this, the present invention provides a touch point correction method for a DCT, including a) determining respective temperatures of a first pressure plate, a second pressure plate, and a center plate and measuring an average temperature of the determined temperatures; b) determining rotational inertia based on the average temperature measured at a); c) determining a touch point correction amount based on the rotational inertia determined at b) and engine speed of a vehicle; and d) correcting a touch point of a relevant clutch using the touch point correction amount determined at c).

Here, c) may include determining a centrifugal force based on the rotational inertia determined at b) and the engine speed of the vehicle.

Here, c) may be configured to determine the touch point correction amount based on the determined centrifugal force.

In another embodiment of the present invention, a touch point correction method for a DCT, including a) determining a correction amount depending on temperature of any one selected from a first pressure plate and a second pressure plate; b) determining rotational inertia depending on the temperature of the selected pressure plate; c) determining a centrifugal force based on the rotational inertia of the selected pressure plate and speed of an engine; d) determining a correction amount based on the centrifugal force of the selected pressure plate; e) determining a final touch point correction amount in consideration of the respective correction amounts determined at a) and d); and f) correcting a touch point of a relevant clutch using the final touch point correction amount determined at e).

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
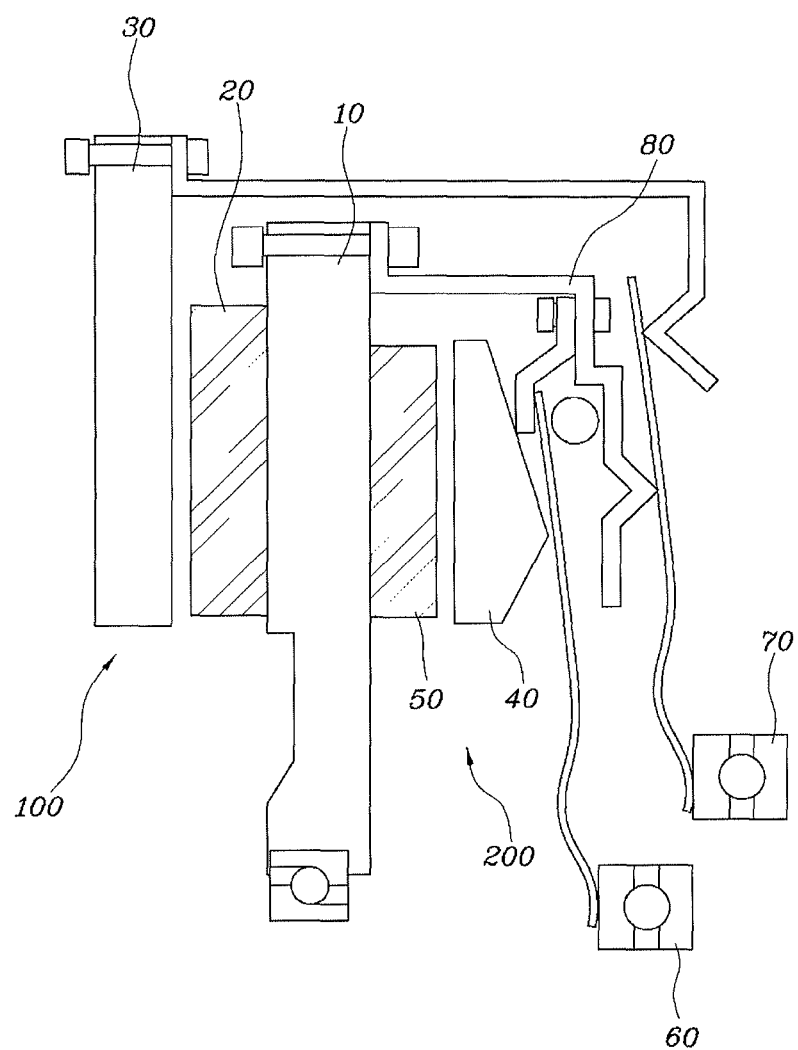
FIG. 1 is a conceptual diagram showing the clutch structure of a conventional DCT.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, embodiments of a touch point correction method for a DCT according to an exemplary embodiment of the present invention will be described in detail with reference to the attached drawings.

Figure 2:
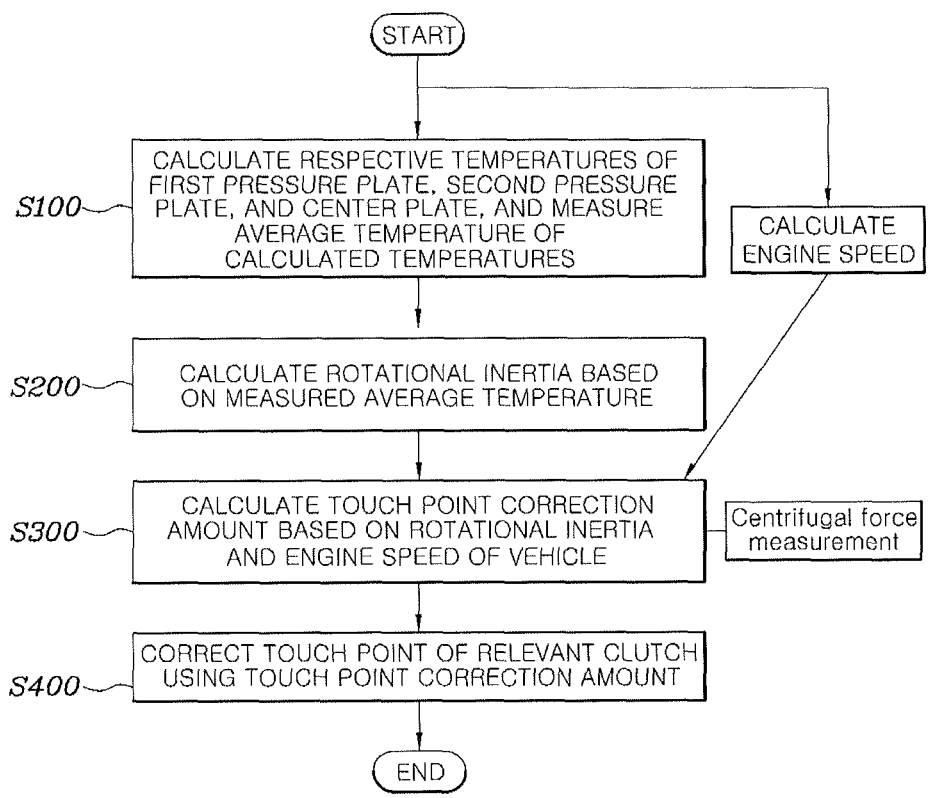
FIG. 2 is a flowchart showing the overall process of a touch point correction method for a DCT according to an exemplary embodiment of the present invention.

FIG. 2 is a flowchart showing the overall process of a touch point correction method for a DCT by a controller according to an exemplary embodiment of the present invention. As shown in the drawing, the touch point correction method of the present invention includes the system average temperature measurement step S100 of calculating respective temperatures of a first pressure plate, a second pressure plate, and a center plate, and measuring an average temperature of the calculated temperatures, the system rotational inertia measurement step S200 of calculating rotational inertia based on the average temperature calculated at the system average temperature measurement step, the correction amount calculation step S300 of calculating the amount of touch point correction based on both the rotational inertia calculated at the system rotational inertia measurement step and the engine speed of a vehicle, and the correction step S400 of correcting the touch point of a relevant clutch using the touch point correction amount calculated at the correction amount calculation step.

The controller can be realized by one or more processors activated by a predetermined program, and the predetermined program can be programmed to perform each step of the touch point correction method according to an exemplary embodiment of this invention.

That is, the present invention is intended to improve conventional technology that corrects the touch point of a clutch without considering the engine speed and the rate of a change in rotational inertia depending on an increase in the temperatures of pressure plates and a center plate constituting a clutch structure. Further, the present invention is configured to primarily perform the system average temperature measurement step of measuring respective temperatures of the first pressure plate, the second pressure plate, and the center plate constituting the clutch structure and then obtaining the average temperature of the measured temperatures.

Next, the rotational inertia of a system composed of the first pressure plate, the second pressure plate, and the center plate is calculated using a map in which relationships between average temperatures and rotational inertia values are previously stored.

Meanwhile, as will be described later, the centrifugal force is changed depending on the engine speed of the vehicle and the rotational inertia. The centrifugal force depending on changes in temperature and speed is calculated based on the rotational inertia, which is calculated by a pre-stored centrifugal force calculation means, and the engine speed.

That is, the correction amount calculation step is characterized in that the centrifugal force is calculated based on the rotational inertia calculated at the system rotational inertia measurement step and the engine speed of the vehicle. The touch point of the first clutch or the second clutch that is the relevant clutch is corrected using the touch point correction amount calculated at the correction amount calculation step.

Then, compared to conventional technology for correcting a touch point depending on a change in the temperature of a clutch, when a touch point is corrected using the procedure of the present invention, the operational reliability of the relevant clutch is improved, so that slipping of the clutch is reduced to improve the durability of the clutch, and so that an undesired impact or the like is prevented upon shifting the gear to improve gear-shifting quality, thus contributing to the improvement of marketability of vehicles.

Figure 3:
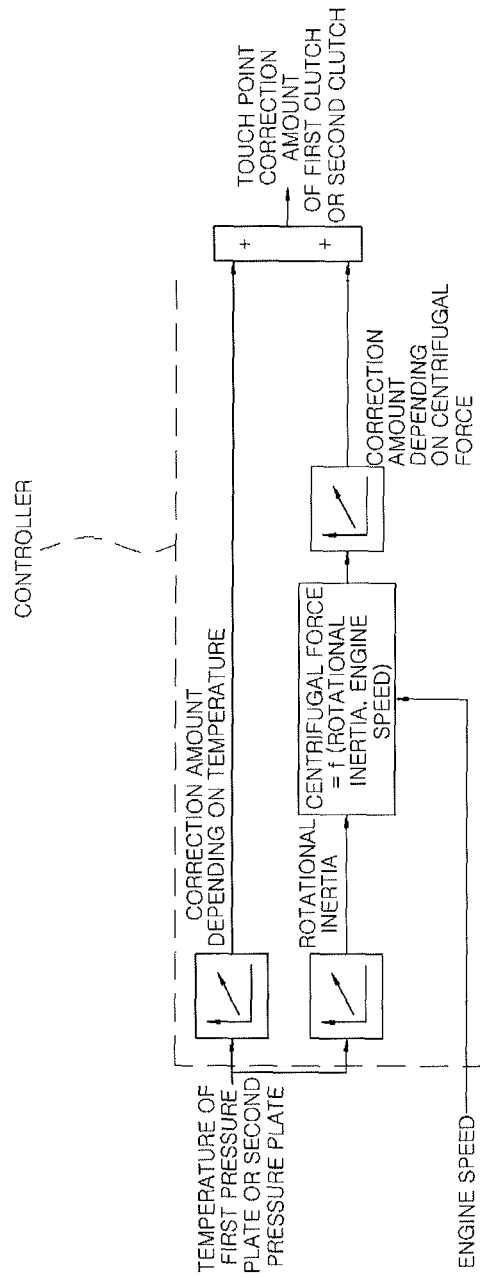
FIG. 3 is a block diagram showing a touch point correction method for a DCT according to another embodiment of the present invention.

Meanwhile, the touch point correction method according to an exemplary embodiment of the present invention is a method of calculating the temperatures of the first pressure plate, the second pressure plate, and the center plate, and correcting the touch point of the first clutch or the second clutch using the average of the temperatures, but may also correct the touch point of the clutch, as in a method illustrated in the block diagram of FIG. 3.

As shown in the drawing, the correction method of the present invention includes the temperature correction step of calculating the amount of correction (correction amount) depending on the temperature of any one selected from a first pressure plate and a second pressure plate, the step of calculating rotational inertia depending on the temperature of the selected pressure plate, the step of calculating a centrifugal force based on the rotational inertia of the selected pressure plate and the speed of an engine, the centrifugal force correction step of calculating a correction amount based on the centrifugal force of the selected pressure plate, the total correction amount calculation step of calculating a final touch point correction amount in consideration of the respective correction amounts calculated at the temperature correction step and the centrifugal force correction step, and the step of correcting the touch point of the relevant clutch using the final touch point correction amount calculated at the total correction amount calculation step.

That is, a touch point correction amount depending on temperature change is calculated by applying the temperature change to a preset map for correction amounts depending on changes in the temperatures of pressure plates. The rotational inertia depending on the temperature of the selected pressure plate is calculated by applying the temperature of the pressure plate to a preset map for changes in rotational inertia depending on the temperature changes of pressure plates. The centrifugal force is measured by a preset centrifugal force calculation means based on the rotational inertia and the engine speed. The touch point correction amount is calculated by applying a change in the measured centrifugal force to the correction amount map.

Via the above process, the present invention may finally correct the touch point of the relevant clutch in consideration of the correction amount depending on a change in the centrifugal force, in addition to the correction amount depending on the temperature change as in the conventional technology.

As described above, in accordance with the touch point correction method for a DCT according to an exemplary embodiment of the present invention having the above configuration, the touch points of clutches are corrected in consideration of not only changes in the touch points of a first clutch and a second clutch depending on changes in the temperatures of a first pressure plate, a second pressure plate, and a center plate constituting a clutch structure, but also a change in a centrifugal force depending on temperature change, so that the clutches may be more suitably controlled, thus improving the durability of the clutches and preventing the impact of gear-shifting, with the result that the marketability of vehicles may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A touch point correction method for a Dual Clutch Transmission (DCT), comprising:
    a) determining, by a controller, respective temperatures of a first pressure plate, a second pressure plate, and a center plate and calculating an average temperature of the determined temperatures;
    b) determining, by the controller, a rotational inertia using a map in which relationships between average temperatures and rotational inertia values are previously stored based on the average temperature calculated at the a);
    c) determining, by the controller, a touch point correction amount using a preset map for changes in the rotational inertia based on the rotational inertia determined at the b) and engine speed of a vehicle;
    d) correcting, by the controller, a touch point of a relevant clutch using the touch point correction amount determined at the c); and
    e) controlling, by the controller, the relevant clutch using the touch point corrected at the d).

2. The touch point correction method of claim 1, wherein the c) comprises determining a centrifugal force based on the rotational inertia determined at b) and the engine speed of the vehicle.

3. The touch point correction method of claim 2, wherein the c) is configured to determine the touch point correction amount based on the determined centrifugal force.

4. A touch point correction method for a Dual Clutch Transmission (DCT), comprising:
    a) determining by a controller, a correction amount depending on a temperature of one selected from a first pressure plate and a second pressure plate;
    b) determining by the controller, a rotational inertia using a preset map for changes in the rotational inertia depending on the temperature of the selected pressure plate;
    c) determining by the controller, a centrifugal force using a preset centrifugal force calculation means based on the rotational inertia of the selected pressure plate and a speed of an engine;
    d) determining by the controller, a correction amount based on the centrifugal force of the selected pressure plate;
    e) determining by the controller, a final touch point correction amount in consideration of the respective correction amounts determined at the a) and the d);
    f) correcting by the controller, a touch point of a relevant clutch using the final touch point correction amount determined at the e); and
    g) controlling, by the controller, the relevant clutch using the touch point corrected at the f).

* * * * *